(12) United States Patent
Rosenoff et al.

(10) Patent No.: US 9,092,756 B2
(45) Date of Patent: Jul. 28, 2015

(54) INFORMATION-RETRIEVAL SYSTEMS, METHODS AND SOFTWARE WITH CONTENT RELEVANCY ENHANCEMENTS

(75) Inventors: Douglas T. Rosenoff, Issaquah, WA (US); Christopher Crowhurst, Whitehall, MD (US)

(73) Assignee: THOMSON REUTERS GLOBAL RESOURCES, Baar (CH)

( * ) Notice: Subject to any disclaimer, the term of this patent is extended or adjusted under 35 U.S.C. 154(b) by 0 days.

(21) Appl. No.: 13/330,186

(22) Filed: Dec. 19, 2011

(65) Prior Publication Data

US 2012/0117048 A1    May 10, 2012

Related U.S. Application Data

(63) Continuation of application No. 12/557,665, filed on Sep. 11, 2009, now Pat. No. 8,346,764, which is a continuation of application No. 12/359,024, filed on Jan. 23, 2009, now abandoned, which is a continuation (Continued)

(51) Int. Cl.
*G06F 17/30* (2006.01)
*G06Q 10/10* (2012.01)
*G06Q 50/18* (2012.01)

(52) U.S. Cl.
CPC .............. *G06Q 10/10* (2013.01); *G06Q 50/18* (2013.01)

(58) Field of Classification Search
CPC ....... G06Q 50/18; G06Q 10/10; G06Q 30/02; G06Q 30/0251; G06Q 10/06393; G06Q 30/00; G06Q 30/0241; G06Q 30/0277; G06Q 30/06; G06Q 50/01; G06F 17/30; G06F 17/30864; G06F 17/30867; G06F 11/1438; G06F 11/1441; G06F 17/2229; G06F 17/2247

USPC .................. 707/765, 766, 751, 768, 999.005, 707/E17.074, E17.071, E17.112, E17.084, 707/722, 748; 704/E19.045, E19.046
See application file for complete search history.

(56) References Cited

U.S. PATENT DOCUMENTS 5,977,964 A * 11/1999 Williams et al. ............... 715/721
6,493,702 B1 * 12/2002 Adar et al. ..................... 707/706
6,772,149 B1 * 8/2004 Morelock et al. ................. 704/1

(Continued)

OTHER PUBLICATIONS

Dua, S.; Eungchun Cho; Iyengar, S.S.—"Discovery of Web frequent patterns and user characteristics from Web access logs: a framework for dynamic Web personalization"—Application-Specific Systems and Software Engineering Technology, 2000. Proceedings. 3rd IEEE Symposium on, Mar. 24-25, 2000; pp. 3-8.*

(Continued)

*Primary Examiner* — Anh Ly
(74) *Attorney, Agent, or Firm* — Hoffmann & Baron, LLP

(57) ABSTRACT

The present inventors devised, among other things, systems, methods, and software for enhancing the relevancy of content presented to users in response to queries in an online information retrieval system. One exemplary system refines a user input query by making suggestions of alternatives queries. A switchboard module converts the refined query, administers one or more searches, and collects search results from one or more search engines based on the refined query. And, a postprocessor module refines the collected search results by, for example, modifying the order of the results, removing inappropriate or undesirable content from the results, and/or applying historical performance analysis, based for example on social feedback.

16 Claims, 5 Drawing Sheets

Related U.S. Application Data of application No. 12/156,662, filed on Jun. 2, 2008, now abandoned.

(60) Provisional application No. 60/932,795, filed on Jun. 1, 2007.

(56) References Cited

U.S. PATENT DOCUMENTS

| | | | | |
|---|---|---|---|---|
| 6,868,525 | B1* | 3/2005 | Szabo | 715/738 |
| 6,980,984 | B1* | 12/2005 | Huffman et al. | 707/999.003 |
| 6,996,571 | B2* | 2/2006 | McConnell | 707/E17.014 |
| 7,072,328 | B2* | 7/2006 | Shen et al. | 370/352 |
| 7,096,214 | B1* | 8/2006 | Bharat et al. | 707/708 |
| 7,206,778 | B2* | 4/2007 | Bode et al. | 707/999.004 |
| 8,346,764 | B1* | 1/2013 | Rosenoff et al. | 707/723 |
| 8,812,523 | B2* | 8/2014 | Marwah et al. | 707/754 |
| 2001/0047355 | A1* | 11/2001 | Anwar | 707/5 |
| 2001/0049677 | A1* | 12/2001 | Talib et al. | 707/3 |
| 2002/0016786 | A1* | 2/2002 | Pitkow et al. | 707/3 |
| 2002/0149614 | A1* | 10/2002 | Biebesheimer et al. | 345/738 |
| 2003/0041077 | A1* | 2/2003 | Davis et al. | 707/500 |
| 2003/0115187 | A1* | 6/2003 | Bode et al. | 707/3 |
| 2004/0024739 | A1* | 2/2004 | Copperman et al. | 707/1 |
| 2005/0149496 | A1* | 7/2005 | Mukherjee et al. | 707/3 |
| 2005/0165766 | A1* | 7/2005 | Szabo | 707/3 |
| 2005/0234891 | A1* | 10/2005 | Walther et al. | 707/3 |
| 2006/0288023 | A1* | 12/2006 | Szabo | 707/100 |
| 2007/0156677 | A1* | 7/2007 | Szabo | 707/5 |
| 2007/0250487 | A1* | 10/2007 | Reuther | 707/3 |
| 2007/0276854 | A1* | 11/2007 | Gold | 707/101 |
| 2008/0040308 | A1* | 2/2008 | Ranganathan et al. | 707/1 |
| 2008/0071772 | A1* | 3/2008 | Rosenoff et al. | 707/5 |
| 2010/0138271 | A1* | 6/2010 | Henkin et al. | 705/10 |
| 2010/0138451 | A1* | 6/2010 | Henkin et al. | 707/803 |
| 2010/0332583 | A1* | 12/2010 | Szabo | 709/202 |
| 2011/0131210 | A1* | 6/2011 | Bierner | 707/740 |

OTHER PUBLICATIONS

"Automatic Web page categorization by link and context analysis"—G Attardi, A Gulli, F Sebastiani—Proceedings of THAI, 1999—wortschatz.uni-leipzig.de—pp. 1-16.*

* cited by examiner

Figure 4 — Nested Sets

INFORMATION-RETRIEVAL SYSTEMS, METHODS AND SOFTWARE WITH CONTENT RELEVANCY ENHANCEMENTS

CROSS-REFERENCE TO RELATED APPLICATIONS

This application is a continuation of U.S. patent application Ser. No. 12/557,665 filed on Sep. 11, 2009, which is a continuation of U.S. patent application Ser. No. 12/359,024 filed on Jan. 23, 2009, now abandoned, which is a continuation of U.S. patent application Ser. No. 12/156,662 filed on Jun. 2, 2008, now abandoned, which claims priority to U.S. Provisional Patent Application 60/932,795 filed on Jun. 1, 2007, all of which are incorporated herein by reference in their entireties.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2006, Thomson Reuters Global Resources, an entity organized under the laws of Ireland.

TECHNICAL FIELD

Various embodiments of the present invention concern information-retrieval systems and related query processing components and methods.

BACKGROUND

The growth in popularity of the Internet and other computer networks has fueled not only an increasing availability, but an increasing appetite among computer users for digital information. Users typically seek access to this information using an access device, such a computer, to communicate with an online information-retrieval system. The information-retrieval system typically includes a graphical user interface for entering and submitting requests for information, known as queries, to a remote search engine. The search engine identifies relevant information, typically in the form of documents, and returns a results list to the user's access device.

One problem that the present inventors recognized in conventional information-retrieval systems concerns users entering poorly defined queries and receiving search results that include hundreds or maybe even thousands of documents. Even though the documents are often ranked in terms of quantitative relevance to the query, the task of identifying the documents most pertinent to the user's objective is onerous and time consuming. Moreover, if the query is poorly defined, the ultimate ranking of results is unlikely to be useful.

Accordingly, the inventors have identified a need to further improve how information-retrieval systems process user queries.

SUMMARY

To address this and/or other needs, the present inventors devised, among other things, systems, methods, and software for enhancing the relevancy of content presented to users in response to queries in an online information retrieval system. One exemplary system includes a database and a server for receiving and answering queries for content n the database. The server further includes a preprocessing module, a switchboard module, and a post-processing module.

The preprocessing module refines a user input query by making suggestions of alternatives queries, classifying the query using language processing, or selecting one or more portions of the legal-research database or search engines as a target for the refined query.

The switchboard module converts the refined query and associated information developed by the pre-processor module, administers one or more searches, and collects search results based on the refined query.

The post-processing module receives search results based on the refined input query and refines the search results. Exemplary refinements include modifying the order of the search results, removing inappropriate or undesirable content from the results, and/or applying historical performance analysis to improve the relevance of the information presented to the user.

DETAILED DESCRIPTION

This document describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Information-Retrieval System

Figure 1:
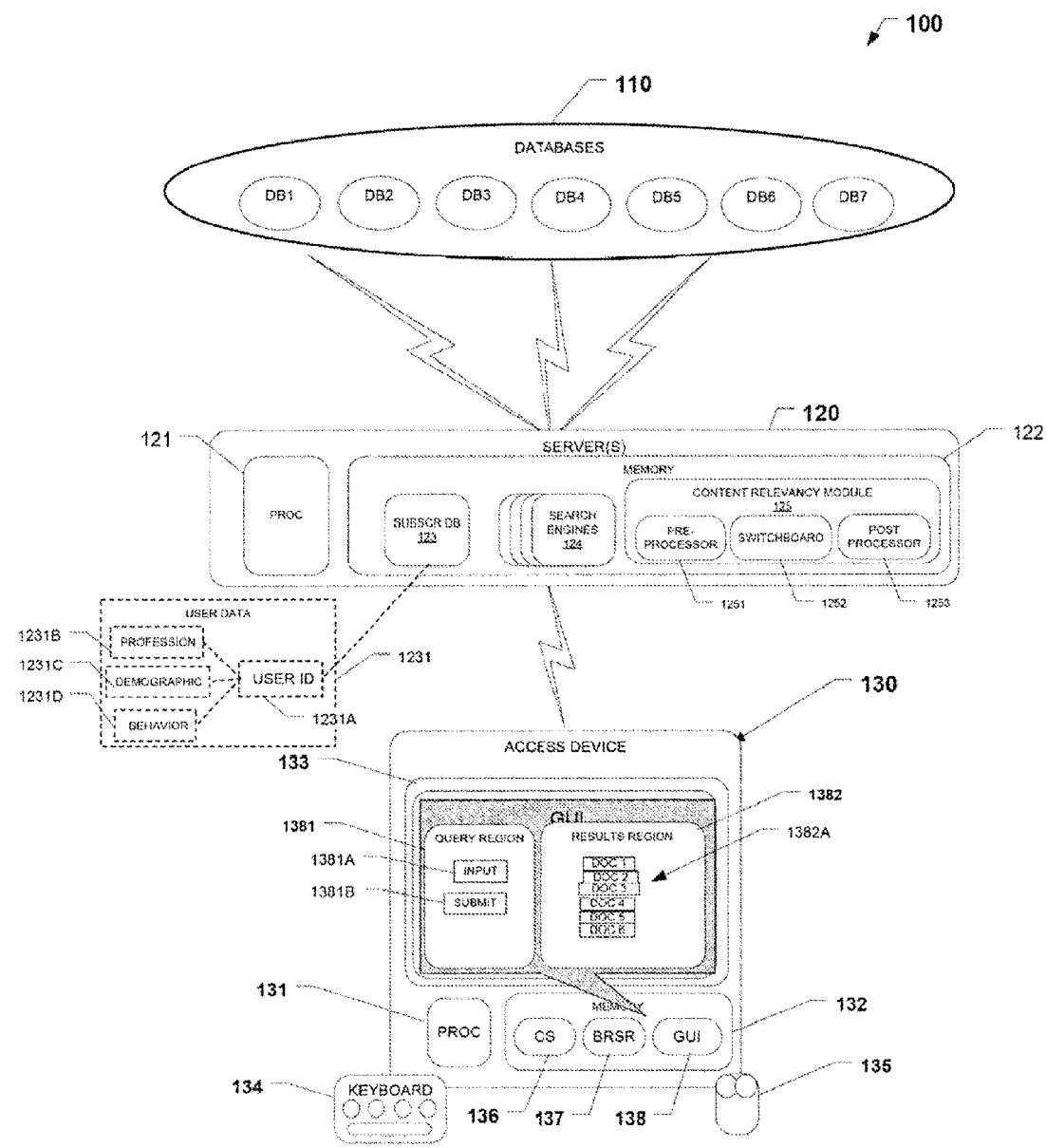
FIG. 1 is a block diagram of an exemplary information-retrieval system 100 which corresponds to one or more embodiments of the present invention.

FIG. 1 shows an exemplary online information-retrieval system 100. System 100 includes one or more databases 110, one or more servers 120, and one or more client access devices 130.

Databases 110 include a set of one or more databases. Exemplary legal databases include a caselaw database and a statutes database, which respectively include judicial opinions and statutes from one or more local, state, federal, and/or international jurisdictions. Exemplary legal databases also include legal classification databases and law reviews. Other exemplary databases provide attorney, judge, law firm, product, and corporate profiles. In some embodiments, the caselaw documents are logically associated via a data structure with documents or profiles in other databases. Other embodiments may include non-legal databases that include financial, scientific, or health-care information. Still other embodiments provide public or private databases, such as those made available through INFOTRAC. Some embodiments also include web sites and web pages.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Exemplary Server

Server device (server) 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, search modules or engines 124, and a content-relevancy module 125.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, primary search module 124, and content relevancy module 125.

Subscriber database 123 includes subscriber-related data for controlling, administering, and managing pay-as-you-go or subscription-based access of databases 110. In the exemplary embodiment, subscriber database 123 includes one or more preference data structures, of which data structure 1231 is representative. Data structure 1221 includes a customer or user identifier portion 1231A, which is logically associated with one or more user data fields or preferences, such as fields or preferences 1231B, 1231C, and 1231D. Field 1231B includes data regarding the profession of the user. Field 1231C includes demographic data regarding the user. Field 1231D includes data regarding online behavior of the user. (In the absence of a temporary user override, for example, an override during a particular query or session, the default value for the user preference governs.)

Search module 124 includes one or more search engines and related user-interface components, for processing queries against one or more of databases 110. In some embodiments, one or more search engines associated with search module 124 provide Boolean, tf-idf, natural-language search capabilities, or search engines specialized for searching multimedia or types of content. In the exemplary embodiment, search engines are regarded as third-party, commodity black-box components or environments that are selected according to the desires (explicit or derived) of the user and/or requesting application. In the above figure, the search engines are coupled directly or operatively to one or more corresponding databases (not shown). In some embodiments, two or more of the search engines are coupled to the same database; whereas in other embodiments, the search engines are each coupled to separate and independent databases. In some instances, the databases are under control or ownership of third-parties.

Content-relevancy module 125 includes machine readable and/or executable instruction sets for enhancing the relevancy of content provided to users in response to their queries. To this end, content-relevancy module 125 includes a pre-processor module 1251, a switchboard module 1252, and a post-processor module 1253.

In general, the function pre-processor module 1251 is to process a user input query, refine it, make suggestions of alternatives, classify the query using language processing, and select the appropriate content sources or search engines. Switchboard module 1252 converts the refined query and associated information developed by pre-processor module 1251 to administer one or more searches, and collect the search results. Post-processor 1253 refines the search results, modifying the order of results, removing inappropriate or undesirable content, and/or applying historical performance analysis to improve the relevance of the information ultimately presented to a user of an access device, such as access device 130. (More detailed description of the function and features of the modules within content-relevance module 125 is provided below.)

Exemplary Access Device

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120 to implement the interfaces shown above or described elsewhere in this description.)

In the exemplary embodiment, each of these control features takes the form of a hyperlink or other browser-compatible command input, and provides access to and control of a query region 1381 and a search-results region 1382. User selection of the control features in query region 1381, specifically input of a textual query into input field 1381A and submission of the query to server 120 via actuation of submit button 1381B, results in presentation of search results list 1382A in results region 1382. Selection of a listed document from list 1382A results in retrieval of and display of at least a portion of the corresponding document within a region of interface 138 (not shown in this figure.) Although FIG. 1 shows regions 1381 and 1382 as being simultaneously displayed, some embodiments present them at separate times.

Exemplary Method(s) of Operation

Figure 2:
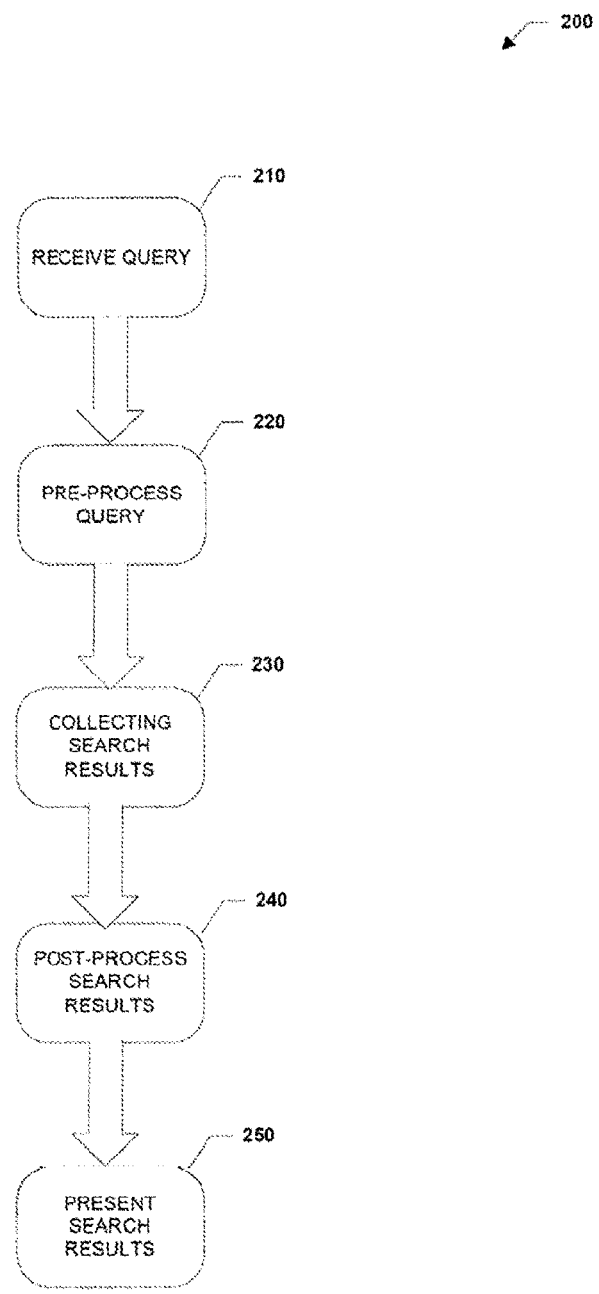
FIG. 2 is a flow chart of an exemplary method of operating system 100, which corresponds to one or more embodiments of the present invention.

FIG. 2 shows a flow chart 200 of one or more exemplary methods of operating a system, such as system 100. Flow chart 200 includes blocks 210-250, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

In block 210 the method begins with receiving a query from a user. In the exemplary embodiment, this entails a user using a browser capability in access device 130 to access online information-retrieval system 100, specifically server 120 using a conventional login process. Once logged in, a user interface, such as interface 138 is rendered, enabling the user to define and submit a query to server 120. Execution proceeds to block 220.

Block 220 entails pre-processing the received query along with related user information. In the exemplary embodiment, pre-processing of the query occurs within pre-processor module 1251 of content-relevancy module 125 in server 120. However, in some embodiments, pre-processor module 1251 may be located in whole or in part within access device 130 or within a separate server. Pre-processing entails parsing the query and related information to separate out specific query term syntactic elements for additional processing. This additional processing can include one or more of the following:

Selecting of one or more ontologies or taxonomies based on the provenance of the requesting application (q.v. selection of the KeySearch for general predefined queries from an online legal research system such as Westlaw, selection of West Legal Directory for queries coded with a field of attorney or judge, or selection of West Medical Taxonomy for queries coming from a malpractice tab of an online research system).

Expanding and/or refining the query to include appropriate broader content topics or concepts as well as more specific topics or query terms. For example, assume a query of the single term "maple". Via the syntactic relationships derived from the taxonomies and other data structures, additional query terms such as "Acer", "Maple Sugar", "Maple Leaf", "Hockey" and "Maple Leaf Hockey Team" "Toronto Sports Teams" might be added depending on the taxonomy(s) selected in a previous step.

Expanding and refining the query to change or select various content sources or search engines by associating the query terms with information found in the taxonomies or ontologies. For example, a query including the term SBX might automatically assign the query to a search engine with better financial coverage or to a SEC filing content source rather than a general purpose search engine. In some embodiments, pre-processor module 1251 uses the information in the query and, optionally, additional information (for example, user or workflow context information) passed by the requesting client application, refines the query. Exemplary refinement includes tailoring the query to the profession, demography, behavior, and/or other defining characteristic of the original user (as indicated in the context information or as may be associated with a user access credentials for the information-retrieval system.). Pre-processor module 1251 also selects one or more appropriate search engines based on an analysis of the information held in the refined query and its related data.

Correcting the query terms for spelling, case, and syntax, depending on both dictionary lookup information and the taxonomy or other semantic lookup method used (q.v. "Aser Palmatum" is corrected to "Acer palmatum" if an taxonomy associated with tree pathology is selected in a prior step or converted to the single query term "Ace" if an ontology associated with gaming is selected.)

To support these activities, pre-processor module 1251 includes a variety of taxonomies, ontologies, folksonomies, synonym lists, reserved or restricted term lists, stop word lists classification algorithms, and semantic tools for processing received queries. Data structures for the taxonomies, ontologies, and so forth may be editorially or programmatically populated and may consist of proprietary and/or public domain data. These structures may be shared among all clients accessing pre-processor module 1251 or restricted to specific requesting applications or clients. These structures may be fixed in that they are not subject to feedback from other components or they may be adaptive in that the contribution they provide for an algorithmic choice may change based on user feedback or input. Each of the various data structures has one or more algorithms for associating specific query terms or semantic elements to the entries in the various data structures. Such relationships maybe combined to produce stronger or weaker recommendations for any of the methods of refining the query mentioned above.

Pre-processor module 1251 also includes functionality for sending clarification and feedback messages back to the user prior to executing the query. Such messages for relevance clarification allow the user to refine their query before incurring the expense of actually running one or more searches. For example, in response to a query including the term *Salvia*, the pre-processor module can request the user for clarification of whether he is interested in "Hallucinogenic Substances" (based on a related concept entry for "*Salvia Divinorum*" in a legal taxonomy). Such clarification messaging are made to the requesting application with the notion that the resulting clarifications (if any) serve as grist for recursive processing of the query before passing it and any related data over to the Switchboard component for forwarding to appropriate search engines.

Pre-processor module 1251 keeps a record of selected operations performed on the input query and the refined query as well as a record of taxonomies, content sources, and/or search engines selected, passing the information to the Switchboard component. Pre-processor module 1251s also provides a mechanism for updating adaptive taxonomies and similar semantic relationship data structures by receiving feedback from the Post-processor. Such feedback may be used to dynamically alter the weights of any given factor used to select related terms, refine concepts or queries, or select content sets or search engines. After pre-processing of the query, execution continues at block 230.

Block 230 entails collecting search results based on the refined or preprocessed query. In the exemplary embodiment, this entails the pre-processor module forwarding the refined or pre-processed query and related information to switchboard module 1252. In turn, switchboard module 1252 forwards the refined query to one or more search engines identified by preprocessor module 1251. (In the exemplary embodiment the switchboard module and the pre-process are implemented using the same server; however, in other embodiments they may be distributed.)

More specifically, the exemplary switchboard module 1252 performs several functions with the preprocessed query and related information as input:

Converting the refined query and related data to the syntax required for one or more search engines;

Submitting the syntactically correct refined query to one or more search engines;

Caching the query and related data, including search engine selection analysis and parameterization;

Waiting for query results to return from one or more search engines according to a set of defined parameters;

Gathering the search results from one or search engines;

Organizing and/or federating the results from one or more search engines; and

Passing the search engine results and the related data to post-processor module 1253.

Switchboard module 1252 also provides a feedback channel for taking information from the post-processor and returning it to pre-processor module 1251. Such feedback data is used to continually refine and enhance the functionality of pre-processor module 1251 by tuning the taxonomies, ontologies, classification schemes, and semantic analysis techniques used in refinement of later queries. Execution continues at block 240.

Block 240 entails post-processing of the search results. To this end in the exemplary embodiment, post-processor 1253 takes as input one or more search results, as well as the refined query and its related information. It then performs a variety of taxonomic, semantic, syntactic, classification, and combinatorial operations on the search result(s), eventually creating a new, highly refined result. The refined result, possessing significantly more targeted, relevant results for the user, is then passed back to the requesting application which then passes it back to the user.

To accomplish this, the post-processor module 1253 may perform a number of operations including:

Federating the results from one or more search engines using a variety of algorithmic and/or user interaction methods;

Formatting the results according to a generic template or one provided by the requesting application;

Collecting and holding feedback information provided by the requesting application;

Refining its own taxonomic, semantic, syntactic, classification and combinatorial operations based on the feedback;

Returning the feedback information to the pre-processor module via the switchboard module for eventual refinement of pre-processing operations;

Logging the execution of the query, the refinements made to the results, and the result itself; and Monitoring and recording the reception and disposition of feedback from the requesting application.

To facilitate reordering and/or redacting or more generally refining the collected search results, post-processor module 1253 also includes a series of data structures. These data structures, which are stored in a memory of or otherwise associated with the post-processor module, may include various whitelists (web sites of known high relevance), black lists (sites to be redacted from result lists), as well as data structures and methods for relating specific terms or topics to particular domains, sub-domains, pages, and/or content types. Such relationships between topics and sites on the Internet (characterized by a Uniform Resource Name) may be created editorially, programmatically by deriving them from one or more ontologies, or taxonomies, and/or adaptively from data provided by user interaction.

Figure 3:
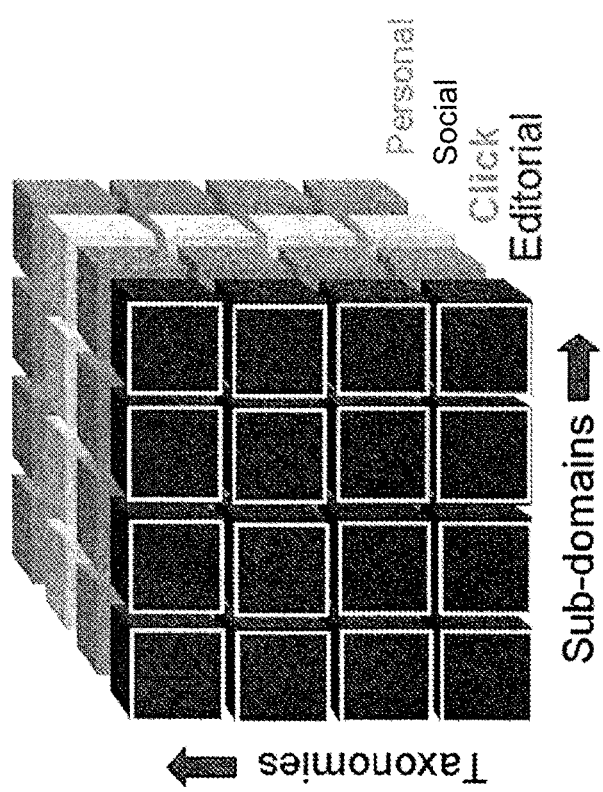
FIG. 3 is a conceptual diagram of a three-dimensional relevance data structure 300 that is used within system 100 and which corresponds to one or more embodiments of the present invention.

FIG. 3 shows one exemplary implementation of three-dimensional data structure, referred to herein as a relevance cube 300. Cube 300 is divided into cells with the x-value of any specific cell in the cube providing a list of URL locations, the y-axis consisting of one or more concepts or terms associated with the relevance and the content of the cube include some weight value.

A field of cells may be defined by deriving the terms from a taxonomy to provide the list of terms along the y-axis of the stack and a list of "white" (highly relevant) sites along the x-axis. Several fields of cells may be combined to form a preference cube, associated with a specific user, for example in a user data structure stored in subscriber database 123. When the post-processor analyzes a raw result set returned from a search engine, an algorithm breaks it down into individual search results associated with a particular result location to which it points, a title, relevance value, and perhaps a snippet of surrounding text.

One embodiment provides another algorithm to scan the individual search results for the location to which it points. If one of the locations is found, the query terms, the page title, and/or any terms in the individual result snippet set are compared with the topic terms to produce one or more derived terms. If an intersection for the location along the x-axis and the derived terms along the y-axis exists, the weight in the corresponding cell is looked up and then be multiplied with a conventional relevance score for the particular result. The newly weighted scores can then be used to bubble the individual search result higher or lower to produce the new refined search result.

Fields may be combined to produce cubes. By traversing along the z-axis through the cube while holding the x- and y-values constant, a combined weight can be derived for a particular topic/location combination. Such a combined weight can be used to reflect numerous additional criteria at the same time.

In the example of FIG. 3, four fields of cells are shown: editorial, click-through, social, and user. The editorial field is created editorially by deriving the topics from a fixed taxonomy and combining those with selected locations on the World Wide Web. Its weighting values are static in the sense that they are not subject to change by user feedback. However the entire field may grow or shrink when additional topics are added to the topology or additional locations are added.

The click-through field is a derived field. It initially consists of no weights but is populated when an individual user clicks through from a search result into a particular document page. Such a click through evidences some decision by a particular user that this page has a higher value than others in a particular search result and hence deserves a higher weighting when subsequent searches results are created by other users. The click through is fed back from the access device to the server and ultimately to the post-processor module. The net of this activity is to raise or lower the weight of a particular cell in this field.

The social field is a derived field. Like the click-through field it is initially blank but populated when users specifically give feedback that the result set is particularly relevant to the terms in the refined query. In such cases, the weights in multiple topic/location cells are raised or lowered to express the user preference.

The user field is a derived field. Like other derived fields it is initially blank but can be populated by the user activity in a variety of ways. For example a particular customer firm or user may block out lists or sites so that they are not included in refined results at all (q.v. black list the sites), raise the value of certain sites as highly relevant to them (q.v. whitelist the site), and block out or enhance the weights of various topic terms. In such cases the resulting field may be made highly specific to a particular customer, company, or even requesting application.

Note that there is no limiting factor on the number of criteria that may be expressed as a particular field. A relevance field may consist of an arbitrary number of topics and locations. Similarly a relevance cube may consist of N arbitrary fields. Note also that different requesting applications may share one or more relevance cubes. Similarly a particular application may restrict itself to a one or more selected cubes, some of which may be proprietary to it alone.

Other Query Post-Processing Strategies

Various trumping strategies are employed in some embodiments to improve relevancy or relevancy indications associated with search results, based on taxonomies, ontologies, whitelists, and related content information used by the other portions of the system.

Trump results are defined as SERP entries that provide the most relevant results possible for a query. In the exemplary embodiment, trump results are complementary to search engine relevancy processing but are driven via editorial processes rather than programmatic algorithmic methods. Put another way, trump results are comparable to trump cards in the game of bridge, in which a card from the trump suite wins a hand, regardless of the value of cards played from non-trump suits. In the exemplary embodiment, a trump result is, by definition, the single most relevant result URL that can be associated with a given taxonomy or query term. In the current implementation, trump results are always editorially defined, though alternate implementations allow for programmatic assignment of trump results based on crawl results, social feedback ratings, or other automatic processing of a content corpus. Other embodiments allow for multiple URLs to be associated with a particular query or taxonomy term, and/or contextual trumping—in which one particular URL or another is suggested depending on other terms appearing in the query and/or the requesting application. Such an alternate implementation might be needed, for example, if two related but distinct applications (e.g. chemistry and bio-chemistry) share a single taxonomy or ontology but have different sites within their specialty that are the most relevant for a particular term.

Though the details will vary, regardless of trump result type, the process of trumping generally entails: a) associating the trump URL with a taxonomy or relevant query term in a whitelist, performed offline at application management time; and b) trumping the SERP results, performed at run time by the post-processing engine.

The exemplary embodiment provides three types of trump results, named for their provenance: Taxonomy Trump Results; Query Trump Results; and SERP Trump Results. Note that all trump types are independent, though results from SERP trumping would form a proper subset of those derived from Query Trumping. When multiple types of trump results are present in a single SERP, the present implementation maintains them as co-equal in the SERP data structure; however alternate implementations need not make this restriction and could rank the trump results, within themselves, by trump type.

Taxonomy trumping is the notion that trump result URLs can be associated directly with leaf nodes in a taxonomy. (As noted above, trumping is based on the notion of associating the one most relevant URL with a particular taxonomy or query term. Since root and medial nodes of a taxonomy express high and medium level concepts, it is likely difficult to associate uniquely valuable and highly specific URL pages with those levels of abstraction. In other implementations, regular expressions might be used to match successively less specific levels of a particular domain with more general levels of a taxonomy, but the utility of this would be highly variable since the uniformity of URL construction, even within a specific site, is frequently inconsistent.

Given this fundamental association, the initial step of setting up a taxonomy trump is to attach trump URLs to leaf nodes in the taxonomy/ontology files held in the application management module. This is, as noted above, an editorial process, though programmatic tools can be used in other embodiments. Once the taxonomy terms have been associated with specific URLs and the run-time system is given access to the taxonomy, processing proceeds as follows:

The user submits query. The pre-processor 1251 parses the query, and relates relevant query terms to a taxonomy entries. If trump URLs are found that are associated with any leaf node taxonomy entries, the pre-processor caches any trump result URLs associated with taxonomy entries for use by the post-processor 1253. The pre-processor then submits the query for normal subsequent pre-processing and whence on to the search engine(s). The post-processor then processes the query results in the normal fashion, re-ranking as appropriate.

Prior to finalizing the SERP for display, the trump result entries are read from the cache and associated with the SERP data structure so that they may be rendered in a visually distinct manner.

Note that taxonomy trump results are independent of the content of the SERP, being derived from the content of the query. This makes Taxonomy trumping something that can be initiated by the pre-processor and run in parallel with retrieval of the raw SERP and re-ranking processes, making it possible to perform the work in an independent thread whose result need only be marshaled at the end and leading to a high performance relevancy improvement.

Note also that, like all trumping strategies, taxonomy trumping puts a very high burden on their correctness of the resulting URLs and thus their ultimate trustworthiness to the user. See section below describing maintaining correctness.

Query Trumping

Query Trumps are based on the association of query terms input by the user to Relevant Query Terms (RQTs) included in the white-list. Relevant query terms may be the same as taxonomy terms, depending on the specific implementation or they may be a separate set of terms that are used in the whitelist.

In preparation for query trumping, the whitelist is extended using the application management module so that for the relevant query terms defined on a whitelist cube face, a column of the trump URLs are added, one for each query term. The whitelist including the trump URLs is then made available to the query pre- and post-processing modules.

In the real time environment (composed of the pre-processor, the switchboard, and post-processor logical modules), the query trumping scenario runs as follows:

The user submits a query. The pre-processor parses the query, and relates relevant query terms in the whitelist. If any relevant query terms entries have associated trump URL entries, the pre-processor caches any trump result URLs associated for use by the post-processor. System processes query results in normal fashion. Prior to finalizing the SERP for display, the trump result entries are read from the cache and associated with the SERP data structure so that they may be rendered in a visually distinct manner.

As with taxonomy trump results, query trump results are independent of the content of the SERP. Query trumping can be initiated by the pre-processor and run in parallel with retrieval of the raw SERP and re-ranking processes, leading to another high performance relevancy improvement.

SERP Trumping: SERP trumping is a variation of query trumping in which the existence of the trump URL is required before the trump result is added to the final re-ranked SERP data structure. SERP trumping shares the same application management needs for assignment of relevant trump URLs to relevant query terms in the whitelist.

SERP trump run time processing proceeds as follows: The user submits a query. The pre-processor parses the query, and relates relevant query terms in the whitelist. If any relevant query terms entries have associated trump URL entries, the pre-processor caches any trump result URLs associated for use by the post-processor. System processes query results in normal fashion to generate the re-ranked SERP. Prior to finalizing the re-ranked data structure the list of trump URLs is compared with the list of re-ranked SERP URLs. If a trump URL appears in the SERP result, it is pulled from the re-ranked SERP and made into a trump result. If a trump URL does NOT appear in the SERP result, it is ignored. The trump result entries are then associated with the SERP data structure so that they may be rendered in a visually distinct manner.

Only SERP trumping is dependent on the results of the SERP and as such must be delayed until the SERP is retrieved and re-ranked before trump processing can commence. As a result it is a serial process and does not have the performance characteristics of the Taxonomy and query trump methods.

Note also that the SERP trump method will yield, a proper subset of the query trump set results, posting a trump result if and only if the trump URL appears in the re-ranked SERP. Of course, a proper subset may be a null set: despite the existence of relevant trump URLs, they will not appear at all if they aren't returned by the search engine in the re-ranked result set.

Correctness: Trumping methods of the type discussed here require that the trumping URLs returned to the user be correct and current. A simple implementation would use a script to automate checking of the trump page URLs to make sure that they did not return a 404 error code. A more optimal implementation of the application management environment employs bots to verify the existence of trumped pages on a frequent periodic basis. Another, more complete implementation would refine application management module to ensure correctness of the trumped result list by creating a stored index of the trump result pages pointed to by trump results. Web crawlers would then be sent out to crawl trump pages on a frequent periodic basis, retrieving the copies of the trump URL pages. The newly crawled pages would then be indexed and compared with existing trump result page indices to verify that no changes have been made. If the indices do not match a programmatic process is initiated to remove the trump URL from the taxonomy or whitelist and an editor is alerted to review the new page.

Stomping to improve relevancy refers to a method of differentiating content using, among other things, social feedback. To facilitate stomping, system 100 includes an application management module for creation, storage and maintenance of taxonomies, ontologies, whitelists, and related content information used by the other portions of the system.

Stomp result entries are defined as SERP URL entries that for content or competitive reasons should remain part of a search result, but must be lowered in relevance compared to other entries. Reasons for stomping down a result might include a known non-trustworthy site, a class of content that is less authoritative (e.g. blog content), duplicative content, content which is synonymic but off-topic, or perhaps content that needs to be included in the SERP for completeness sake but is antithetic to the requirements of the hosting application. Finally, the stomping process is also highly useful for demoting highly SEO'ed (search engine optimized) sites that are oriented purely toward commerce rather than information.

The stomping process (which may be thought of as the opposite of the trump process described herein) moves the stomped result entries to the bottom of the SERP but maintains their relative SERP defined order.

Stomp entries are based on specific URLs. In the current implementation, stomp results are always editorially defined, though alternate implementations may allow for programmatic assignment of stomp results based on crawl results, social feedback ratings, or other automatic processing of a content corpus.

As with trumping, though the details will vary among possible implementations, the process of stomping requires two steps: a) associating the stomp URL with a taxonomy or relevant query term in a whitelist, performed offline at application management time; and b) stomping the SERP results, performed at run time by the post-processing engine. (In the exemplary embodiment, stomped result entries are not the same as Black List results entries. Black list entries are simply truncated from the SERP prior to any additional processing and not included in the final SERP rendering in any way.)

In the current implementation a stomp URL entry may point to a specific fully qualified web page (www.alpha.com/beta/gamma/delta.html), a filtered domain defined by a regular expression (e.g. www.alpha.com/*/) or an entire domain (www.alpha.com/*). All combinations of URLs, filtered URLs, and domains are assumed as possible list entries in the following discussions, even though discussion only makes note of URL entries.

In the exemplary embodiment, there are three types of stomp results, named for their provenance:
Taxonomy Stomp Results;
Query Stomp Results; and
SERP Stomp Results.

Note that all stomp types are independent, though results from SERP Stomping would form a proper subset of those derived from Query Stomping. Note also that even when the first two stomp methods are employed, SERP stomping is still required to correctly re-rank the results for presentation. In the current implementation, stomp results are maintained in the relative order that in which they are listed in the SERP. In alternate implementations need not make this restriction and could rank the stomp results, within themselves, by stomp type.

Taxonomy Stomping: Taxonomy stomping is the notion that stomp result URLs can be associated directly with any node, whether root, medial or leaf node, in a given taxonomy. Given this general association, the initial step of setting up a taxonomy stomp is to attach stomp URLs to leaf nodes in the taxonomy/ontology files held in the application management module. This is, as noted above, an editorial process, though programmatic tools might be created in other implementations.

Once the taxonomy terms have been associated with specific URLs and the run-time system is given access to the taxonomy, processing proceeds as follows: The user submits a query. The pre-processor parses the query, and relates relevant query terms to a taxonomy entries. If stomp URLs are found that are associated with any taxonomy entries, the pre-processor caches any stomp result URLs, domains, or filtered domains associated with taxonomy entries for use by the post-processor.

The pre-processor then submits the query for normal subsequent pre-processing and whence on to the search engine(s). The post-processor then processes the query results in the normal fashion, re-ranking as appropriate. Prior to finalizing the SERP for display, the stomp result entries are read from the cache and associated with the SERP data structure so that they may be rendered in a visually distinct manner, usually removed from the non-whitelist part of the SERP results, and appended to the end. Note that Taxonomy stomp results are independent of the content of the SERP, being derived from the content of the query. As a result, taxonomy stomping can be used to steer content containing particular query terms away from results that are associated with particular taxonomy terms.

For example, consider a taxonomy of the various types of ornamental plants put together for a botanical search engine. Such a taxonomy might include the following entries:
Family: Lamium
Genus: *Salvia*
Species: *argentea*
Species: *clevelandii*
Species: *divinorum*
Species: *patens*
Species: *ulignosa.*

Four of the five entries (*argentea, clevelandii, patens* and *ulignosa*) are ornamental plants of some importance that would have a high relevance for commercial nurserymen, and horticulturists. The fifth specie, *divinorum*, is one prized only for an alleged mild and erratic hallucinatory effect produced in some individuals. Nevertheless, for reasons of completeness, the taxonomic entry and any SERP result entries should be kept but not necessarily emphasized to the detriment of other content more directly of interest. As a result, any URLs (or regular expressions based on web sites) associated with the entry in the taxonomy for *Salvia divinorum* would be marked as stomp entries.

Because of the alleged hallucinogenic properties of *Salvia divinorum*, most of the top entries in any SERP from any general purpose engine will point to sites selling *S. divinorum* seeds, plants, or their preparation, ingestion, and effects. Information about the genus *Salvia* or other species is interspersed throughout, to the detriment of the botanical researcher.

Given that the URLs (or regular expressions filtering their domain, or sub-domain pages) for *S. divinorum* appear in the taxonomy as stomp entries, then, when the searcher executes a query, the associated *S. divinorum* result entries still appear in the SERP, (for reasons of completeness), but are de-emphasized to make room for results more tailored to the desires of the re-ranking host application.

The current implementation uses the pre-processor to aggregate of the taxonomy stomping URL list, running in parallel with retrieval of the raw SERP. The post-processor then does the additional matching and demotion work as part of the normal search processing, prior to rendering. Note also that, like all stomping strategies in the exemplary embodiment, taxonomy stomping puts a very high burden on their correctness of the resulting URLs and thus their ultimate trustworthiness to the user. See section below describing maintaining correctness.

Query Stomping: As with query trumping, query stomping is based on the association of query terms input by the user to Relevant Query Terms (RQTs) included in the white-list. Relevant query terms may be the same as taxonomy terms, depending on the specific implementation or they may be a separate set of terms that are used in the whitelist. In preparation for query stomping, the whitelist is extended using the application management module so that for the relevant query terms defined on a whitelist cube face, a column of the stomp URLs or URL regular expressions are added, one for each query term. The whitelist including the stomp URLs is then made available to the query pre- and post-processing modules.

In the real time system environment (which includes the pre-processor, the switchboard, and post-processor logical modules), the query stomping scenario runs as follows: The user submits a query. The pre-processor parses the query, and relates relevant query terms in the whitelist. If any relevant query terms entries have associated stomp URL entries, domains or filtered domains, the pre-processor caches any stomp result URL or URL regular expressions associated for use by the post-processor.

System processes query results in normal fashion. Prior to finalizing the SERP for display, the stomp result entries are read from the cache and associated with the SERP data structure so that they may be rendered in a visually distinct manner, typically by removing them from the non-whitelist part of the SERP results, and appending them to the end of the SERP, still in relative order. As with taxonomy stomp results, query stomp results are independent of the content of the SERP. Query stomping can be initiated by the pre-processor and run in parallel with retrieval of the raw SERP and re-ranking processes, leading to another high performance relevancy improvement.

SERP Stomping: SERP stomping may be performed as an independent method of stomp processing, but it always performed as part of taxonomy or relevancy stomp processing. When performed as an independent technique, SERP stomping shares the same application management needs for assignment of relevant stomp URLs to relevant query terms in the whitelist. It assumes that a simple list of stomp URLs, domains or regular expressions defined on the domains is a part of the whitelist.

Basic SERP stomp run time processing, in the exemplary embodiment, proceeds as follows: The user submits a query. The system processes query results in normal fashion to generate the re-ranked SERP. Prior to finalizing the re-ranked data structure, but after truncation of any URLs contained on the black list, the list of stomp URLs is compared with the list of raw SERP URLs.

If a stomp URL appears in the SERP result, it is pulled from the re-ranked SERP and added, in order, to the stomp result cache. The remaining list of URLs is re-ranked. The stomp result entries are then appended to the re-ranked result list in the SERP data structure so that they may be rendered in a visually distinct manner.

Only SERP stomping is dependent on the results of the SERP and as such must be delayed until the SERP is retrieved and re-ranked before stomp processing can commence. As a result it is a serial process and does not have the performance characteristics of the taxonomy and query stomp methods.

When performed as a final step for taxonomy or query term stomping, SERP stomping is executed as follows: The user submits a query. The pre-processor parses the query, and relates relevant query terms in the whitelist. If any relevant query terms or taxonomy entries have associated stomp URL entries, the pre-processor caches any stomp result URLs, domains, or domain filters associated for use by the post-processor.

System processes query results in normal fashion to generate the raw SERP. Prior to finalizing the re-ranked data structure, but after truncation of any URLs contained on the black list, the list of stomp URLs is compared with the list of raw SERP URLs. If a stomp URL appears in the SERP result, it is pulled from the re-ranked SERP and added, in order, to the stomp result cache. The remaining list of URLs is re-ranked. The stomp result entries are then appended to the re-ranked result list in the SERP data structure so that they may be rendered in a visually distinct manner.

Correctness: Like trumping, stomping methods in the exemplary embodiment require that the stomping URLs, domains, or filtered domains in the final SERP be correct and current. A simple implementation includes a script to automate checking of the stomp page URLs to make sure that they did not return a 404 error code. A more optimal implementation of the application management environment will employ bots to verify the existence of stomped pages on a frequent periodic basis. Another, more complete implementation would refine application management module to ensure correctness of the stomped result list by creating a stored index of the stomp result pages pointed to by stomp results. Web crawlers would then be sent out to crawl stomp pages on a frequent periodic basis, retrieving the copies of the stomp URL pages. The newly crawled pages would then be indexed and compared with existing stomp result page indices to verify that no changes have been made. If the indices do not match a programmatic process is initiated to remove the stomp URL from the taxonomy or whitelist and an editor is alerted to review the new page.

Social Feedback, Folksonomies and Relevancy

The notion of social feedback generating additional relevancy for search results relies on a slice of the relevancy cube devoted to storing data derived from social feedback. In gathering social feedback, the system gathers and records implicit and explicit feedback events, logging them and eventually integrating them into the relevancy cube. Social feedback may drive instantaneous updates to the cube or may be editorially inspected and filtered before being submitted as a cube update. Both update types make the cube adaptive to user feedback, though on varying time scales and both have various advantages and disadvantages.

Immediate update continuously tailors the cube in real time and thus will populate and refine the cube as users are performing activities with and around searching. However it is also liable to spamming by users if the same page(s) are hit numerous times only for the sake of changing the value of a particular page. Delayed update still tailors the cube but delays the refinement until after human or machine editorial processes have reviewed the feedback events to make sure that they are legitimate. Such delayed tuning may be used as an internal feedback mechanism to finely tune both the update information and query/taxonomy classification.

In the exemplary embodiment, social feedback is divided into two types: implicit and explicit. Implicit social feedback occurs when the system observes an activity by the user that is not an overt feedback rating. Examples of implicit social feedback are opening (document click-through), printing, emailing, or bookmarking a specific result document. Explicit social feedback is given when the user specifically rates a search engine result page (SERP) or a specific result document or tags a particular document. Both types of feedback may be collected and used to influence the social weighting of a given result in the relevancy cube. Implicit and Explicit feedback layers may be given their own layers, or depending on the granularity desired, each activity may be given its own layer. In any event, all social feedback layers can be summed and treated as the single social feedback layer shown in the original note's logical diagram.

Impact of Social Feedback on Relevancy: Social feedback is a cumulative measure that is placed against a combination of relevant query terms or terms from a taxonomy/ontology and one or more URLs. As such the more social feedback one receives, of either type, on a particular document the more relevancy the document should be given. However, all social feedback must be normalized by some fraction of the potential contributors to prevent skewing of the results.

Some types of social feedback are more valuable and should be granted more weight than others. Activities and weights are given below in order of increasing worth:

| Feedback type | Relative Weight | Sample Weight |
| --- | --- | --- |
| Explicit: SERP Rating | Lowest | 1.01 |
| Implicit: Document Click-Through | Medium | 1.025 |
| Implicit: Email Print | High | 1.05 |
| Implicit: Bookmark | High | 1.05 |
| Explicit: Tagging | Highest | 1.075 |
| Explicit: Result Document Rating | Highest | 1.075 |

Table Notes:
Sample weights are provided as illustrative only of the types of weights that might be applied against a URL with a neutral weight of 1.000. Other values or magnitudes will likely turn out to be correct. While an explicit rating by the user of an entire SERP might seem like a strong validation, it is not clear at the time of the rating event whether the user has merely looked at the titles and snippets from each result or stepped into each document and evaluated it more thoroughly. Similarly, an explicit SERP rating must be normalized against each document in the SERP and so must be diluted to account for the effects of examination of only a few documents but rating the entire SERP. As a result, the ultimate rating given to each URL must be relatively small, even if the SERP rating was high. As anecdotally well known, users seldom rate or comment on something unless they are polarized about it: they rate something when they are either very impressed or very disgusted. Seldom do users bother to rank something as providing only medium value. As a result, when a user bothers to rate a particular document, the results should be very strongly weighted because we know that they are passionate about expressing their viewpoint.

Note that since not all types of feedback are collected for a particular URL, the various types of feedback must be normalized against themselves as well. Empirical tuning experiments will probably be necessary to correctly weight each type of feedback both against other feedback events of the same type and against other feedback types. Finally, cumulative social feedback based relevancy must be weighted against editorially derived relevancy to make sure that the wisdom of subject matter experts is honored with the usage of the customers.

Social feedback can also be a form of feedback by itself. By showing users the cumulative social feedback rating for a particular URL as a value either on the page or on the SERP containing a URL, they could use the information as another information scent marker.

Bookmarks: Bookmarking in an implicit type of social feedback in which a user marks a page as one that they are interested in returning to at some point in the future. Bookmarks may be saved locally to a user's disk, to an application, or to a user's network via tools like Del.icio.us, Digg, MSN Live, Yahoo, and Google bookmark services. Since bookmarking is such a powerful statement of the worth of the content, users should be given every way possible to create bookmarks of any type, though obviously bookmarks to an application are of the most utility since they can be trapped, analyzed, and shared within a user's organization. Bookmarks are closely related to tagging; indeed a bookmark may be tagged with a description to make it more valuable to the user or their network.

Tagging and Folksonomies: Tagging is an explicit type of social feedback in which the user assigns keywords to a particular URL. Keywords maybe associated with a bookmark (q.v. Del.icio.us) or with the document itself, without difference in net effect for relevancy.

Keywords added to a document collection define, over time, an informal taxonomy or folksonomy. Such folksonomies frequently have less rigor than taxonomies created for the same corpii by professionals. However, they have the charm and utility of representing the words that practitioners associated with a topic use to denote and annotate particular documents. Folksonomies also have the characteristic of being both incomplete and overlapping. Where a professionally developed taxonomy has even coverage of topics at similar layers, folksonomies may have spotty coverage in less commonly visited subjects as well as terms that are imprecisely applied to groups of taxonomy entries that would otherwise be carefully separated by a professional.

Consider the following association of Taxonomy and Folksonomy terms:

| Taxonomy Topics | Folksonomy Topics |
| --- | --- |
| Immigration | Immigration |
| Visa | Visa Visas Permits |
| H-1B Visa | Green Card, H1B, H1-B |
| Resident Alien Permit | Resident Permit, Resident Card |
| Applications | Forms, Applications |
| Passport | — |
| Photo | Picture, Photo |

Note that the taxonomy is less precise in that the same term may be applied at multiple levels (q.v. Green Card), lossy (q.v. no equivalent term for passport), and redundant (Photo appears in both the taxonomy and folksonomy). This example also displays the virtue of the folksonomy by showing that common names (Picture), as well as slight but frequently used incorrect (H1B, H1-B) variations may also be included.

Such strengths and weakness compliment a formally prepared taxonomy in a number of ways: When documents are tagged, the relevant query terms and taxonomy terms associated with the query that generated the document are looked up and a folksonomy shadow to the taxonomy is populated with the tags used as topics. For example, Alice runs the query "Green Card". A relevant SERF is returned and she eventually steps into a DHS page (www.dhs.gove/immigration/H-1B). Alice then tags the page with her original query terms (Green Card). The system then associates the existing taxonomy terms for the page, (H-1B Visa) with the new folksonomy term (Green Card) to create the shadow folksonomy terms shown in italics above. In time, and using the same mechanism, additional tags are accumulated and the folksonomy is populated more fully. Note that this folksonomy accumulation mechanism works whether formal taxonomy equivalents are used to expand the relevant query terms are used or not.

As the folksonomy becomes more fully populated, the query pre-processor can then look for equivalences in the taxonomy and the folksonomy. Such equivalences can be used in a variety of ways:

equivalent terms can be suggested to the user based on their appearance either hierarchy;

folksonomy terms can be suggested to the user in the formation of query either in the present system or another search engine;

formally correct taxonomic terms can be immediately substituted when their folksonomy equivalents appear in the query;

after the SERP is returned to the user, folksonomy terms can be illustrated in result views as clouds showing the users alternate terminology for the result at which they are looking;

folksonomy terms can be used as pools of terms useful in labeling clusters with commonly used language rather than the formal language of a taxonomy; and alternate implementations can be implemented to relate the two structures as well.

In the exemplary embodiment, search results are also refined via query entity extraction and taxonomy templates. A semantic web and the complementary semantic search engine are key goals for Internet user and researchers. However this remains elusive since web sites would have to provide semantic information and tagging on their pages; something most sites are loath to do because of the economics, supporting tools, and the like. As a result, most popular search engines attempt to provide semantic search by using a variety of statistical techniques. These techniques use link-in frequency, paper popularity and the like to attempt to isolate the user's desired result across the vast field of web pages from the relatively minimal query given by the user.

Frequently users are looking for something more authoritative—a particular company or organization, a specific place, person or thing. Such things are entities that have definitive and specific semantic meaning Queries crafted by users may include a mixture of entities, modifiers and connecting syntax.

Figure 4:
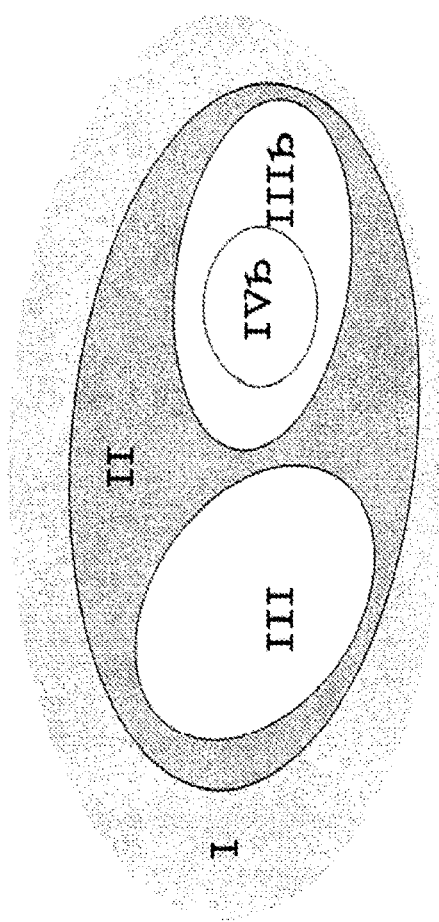
FIG. 4 is a Venn diagram illustrating nested sets, which correspond to one or more embodiments of the present invention.

Consider a collection of nested sets (I, II, III, IIIb, IVb, etc.) as shown in FIG. 4. Such sets can be considered analogous to many nested entity relationships such as might be found in geographic ontologies, corporate structures, financial instrument taxonomies, floral and faunal classification schemes, or any other hierarchical ontology or taxonomy. Alternate implementations may also be created using non-nested taxa or sets.

Method: An exemplary solution for improving the relevancy of such a search using the framework is to do the following:

1) At design time, a series of entity type templates are defined. Each template would consist of a code and a list of allowed values. (The list of allowed values associated with a particular code need not be stored with the template but would instead be held in a database. The template code would serve as a look up into the database.) In the nested set example above, the outer-most entity might have a template code of I and be based on some property, property i. Similar entity templates could be created for different levels within a hierarchy:

Taxonomy Template: $I_i$: $II_j$: $IIIb_k$: $IVb_m$.

2) At design time, the appropriate template codes are appended to taxonomy entries used by the pre-processor. (The list of allowed values is optional for the taxonomy term list; only the template codes are required.) One or more codes could be attached, both in terms of various levels of specificity in a related data model (I, II, III, IV) or of different types of entities (A, B, C). For example, the taxonomy entries in the above example might include the following template codes for a pair of taxonomies:

Taxonomy Entities: I: II: IIIb and A: B: C

3) Also at design time, a set of allowed entity codes and a list of allowed values are attached to (e.g., logically associated with) appropriate URLs in the whitelist. For example, the entries for www.alpha.com/* would have template values codes and values of Whitelist-Entities & Values: $I_i$=(i.a, i.b): $II_j$=(j.a, j.b, j.c): $IIIb_k$=(k.a, k.b, k.c) attached to them. The inclusion of allowed entity template codes and list values with the appropriate URLs form the bridge between the relationships set out in the data models and the authoritative URLs for the locations where the definitive information can be found.

4) At design time, an entity extraction engine (e.g. GATE or similar) is tuned to parse queries for the types of templates defined in the Taxonomy Template codes. It is set up as a service to parse queries on an as-requested basis and to return both the entity template codes and entity values for each entity found.

5) At run time, when a user inputs a query to the system, the query is scanned and the query terms are related to taxonomy entries in the normal manner. The query is passed through the entity extraction engine IF AND ONLY IF an entity code is attached to a taxonomy entry. If a taxonomy code is found to be associated with a taxonomy, then the entire query is passed to the entity extraction engine for parsing. All found entities are returned and held as a list, along with the entity type code and query term with which they were associated.

In the continuing example, the taxonomy entry for the query term j.a includes an entity code (II) and thus a run through the entity parsing engine is required. As a result, the following query entities would be returned by a well trained engine:

Query-derived Entities & Values: $I_i=(\ )$: $II_j=(j.a)$: $IIIb_k=(k.a)$.

6) In parallel with the search processing but prior to the final result re-ranking step, the query-derived entities are compared with the whitelist-derived entities. Where one or more matches occur, the URLs that form the pivot values between the query-derived entities and the whitelist-derived entities are given additional weight as a high quality search result. (Given enough matches, the URLs may become Result Trump URLs and ranked as the highest results.)

With each additional entity match the URL for the match is given additional incremental weight.

| Query Entity | Whitelist Entity | Associated URL | Match |
|---|---|---|---|
| $I_i=(\ )$ | $I_i=i.a$ | www.alpha.com/ | NO |
| $II_j=j.a$ | $II_j=j.a$ | www.alpha.com/* | YES |
| $IIIb_k=k.a$ | $IIIb_k=k.a$ | www.alpha.com/* | YES |

Match $\Sigma = 2$

The resulting up-weighting of the preferred URLs is then used to bubble the preferred URLs closer to the top of the re-ranked search result list. Note that this technique works whether the authoritative URL is included in the list of URLs or not, since no direct reference is made to the list of search results until the final re-ranking Alternate implementations may make other algorithmic optimizations based on advance knowledge of allowed taxonomy values as well.

FIG. 2 shows that after post-processing of the search results in block 240 to produce a refined set of search results, execution continues at block 250. Block 250 entails presenting the refined search results to the use via a graphical user interface such as interface 138 of access device 130 in FIG. 1. As noted above, user interaction with the search results is ultimately fed back to post-processor to enable refinement of relevance weights.

Exemplary Data Flow

Figure 5:
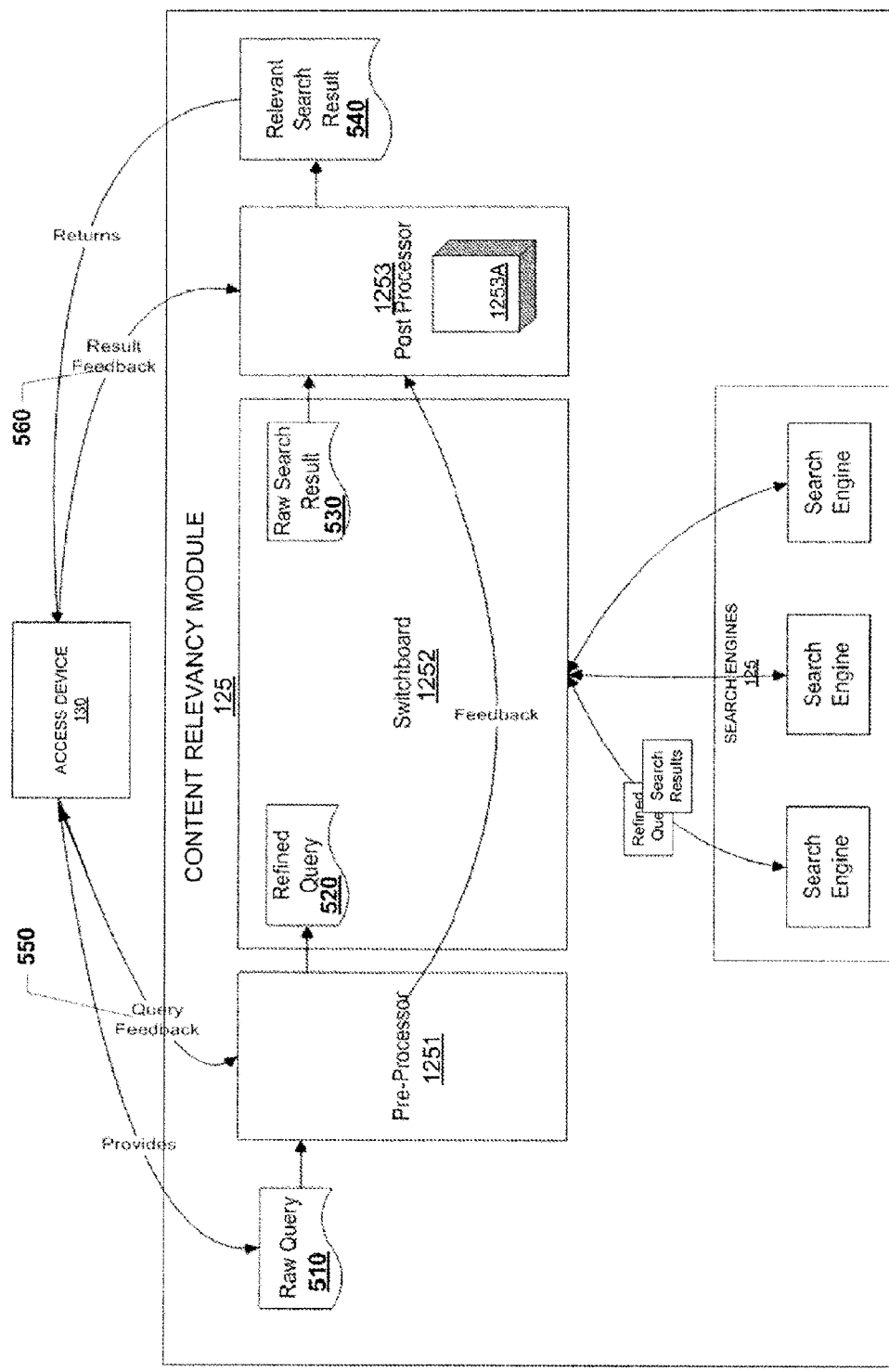
FIG. 5 is an alternative block diagram of various components of system 100, which highlights various data flows and which corresponds to one or more embodiments of the invention.

FIG. 5 shows an alternative block diagram of a portion of system 100, highlighting various data flows between components of content-relevancy module 125, search engines 124, and access device 130. Notably, FIG. 5 shows flow of a raw query 510 from access device 130 to pre-processor module 1251, and a refined query 520 from pre-processor module 1251 to switchboard module 1252. Switchboard module 1252 communicates the refined query and receives search results from search engines 124, aggregating and passing the received results in the form of raw search results 530 to post-processor module 1253. After post-processing, post-processor module 1253 communicates the results as relevant search results 440 to access device 130. Additional data flows, in the exemplary system, include query feedback data 550 from access device 130 to pre-process module 1251 through switchboard module 1252 to post-processor module 1253. Result feedback data 460 flows from access device 130 to post-processor module 1253, facilitating adjustment of weights within relevance cubes 1253A.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

What is claimed is:

1. An information retrieval system, the system comprising:
   at least one database storing a plurality of documents;
   a data structure caching a uniform resource locator for a document predefined to be relevant to at least a portion of a taxonomy; and
   a server coupled to the at least one database, the server comprising a processor and a memory storing instructions that, when executed by the processor, cause the processor to perform operations comprising:
   receiving a query from an application presented by a client access device;
   processing the query against the at least one database to generate a search result identifying at least one document relevant to the query according to a ranking order;
   determining from the data structure the uniform resource locator for the document predefined to be relevant to the at least a portion of a taxonomy based on association of the query with the at least a portion of a taxonomy;
   processing the search result as generated to associate at a position of the ranking order in the search result the uniform resource locator for the document predefined to be relevant to the at least a portion of a taxonomy as determined from the data structure; and
   returning the search result including the associated uniform resource locator for the document predefined to be relevant to the client access device.

2. The system of claim 1, wherein the at least one database includes one or more of a legal database, a law-related database, a financial database, a scientific database, a health-care database, a corporate database, a product database, a website database, a webpage database, a public or a private database, and combinations thereof.

3. The system of claim 1, wherein the at least one taxonomy includes at least one of a legal taxonomy, a financial taxonomy, a scientific taxonomy, and a corporate taxonomy.

4. The system of claim 1, wherein the operations further comprise selecting the taxonomy associated with the query based on provenance of the application.

5. The system of claim 1, wherein the operations further comprise determining the position in the ranking order based on whether the uniform resource locator for the document predefined to be relevant is to be at least one of before and after the at least one document identified in the search result.

6. The system of claim 1, wherein the position is at one of start and end of the search result.

7. The system of claim 1, wherein the operations further comprise:
   determining whether the uniform resource locator for the document predefined to be relevant based on the at least a portion of a taxonomy cached in the data structure exists in the search result; and
   extracting the uniform resource locator for the document predefined to be relevant from the search result if it exists before the uniform resource locator for the document predefined to be relevant is associated with the search result.

8. The system according to claim 1, wherein the operations further comprise adding the uniform resource locator to the search result.

9. A method of retrieving documents, the method comprising:
   caching in a data structure, by a server device having a processor, a uniform resource locator for a document predefined to be relevant to at least a portion of a taxonomy;
   receiving a query, by the server device, from an application presented by a client access device;
   processing, by the server device, the query against at least one database storing a plurality of documents to generate a search result identifying at least one document relevant to the query according to a ranking order;
   determining, by the server device, from the data structure the uniform resource locator for the document predefined to be relevant to the at least a portion of a taxonomy based on association of the query with the at least a portion of a taxonomy;
   processing, by the server device, the search result as generated to associate at a position of the ranking order in the search result the uniform resource locator for the document predefined to be relevant to the at least a portion of a taxonomy as determined from the data structure; and
   returning, by the server device, the search result including the associated uniform resource locator for the document predefined to be relevant to the client access device.

10. The method of claim 9, wherein the method further comprises determining the position in the ranking order based on whether the uniform resource locator for the document predefined to be relevant is to be at least one of before and after the at least one document identified in the search result.

11. The method of claim 9, wherein the method further comprises:
    determining whether the uniform resource locator for the document predefined to be relevant based on the at least a portion of the taxonomy cached in the data structure exists in the search result; and
    extracting the uniform resource locator for the document predefined to be relevant from the search result if it exists before the uniform resource locator for the document predefined to be relevant is associated with the search result.

12. The method according to claim 9, wherein the method further comprises adding the uniform resource locator to the search result.

13. An information retrieval system, the system comprising:
    at least one database storing a plurality of documents;
    a data structure caching a uniform resource locator for the document predefined to be relevant to at least a portion of a query;
    a server coupled to the at least one database, the server comprising a processor and a memory storing instructions that, when executed by the processor, cause the processor to perform operations comprising:
        receiving a query from an application presented by a client access device;
        processing the query against the at least one database to generate a search result identifying at least one document relevant to the query according to a ranking order;
        determining from the data structure the uniform resource locator for the document predefined to be relevant based on the at least a portion of the query;
        processing the search result as generated to associate at a position of the ranking order in the search result the uniform resource locator for the document predefined to be relevant to the at least a portion of the query as determined from the data structure; and
        returning the search result including the associated uniform resource locator for the document predefined to be relevant to the client access device.

14. The system of claim 13, wherein the operations further comprise:
    determining whether the uniform resource locator for the document predefined to be relevant based on the at least a portion of the query cached in the data structure exists in the search result; and
    extracting the uniform resource locator for the document predefined to be relevant from the search result if it exists before the uniform resource locator for the document predefined to be relevant is associated with the search result.

15. A method of retrieving documents, the method comprising:
    caching in a data structure, by a server device having a processor, a uniform resource locator for a document predefined to be relevant in association with the at least a portion of a query;
    receiving the query, by the server device, from an application presented by a client access device;
    processing, by the server device, the query against at least one database storing a plurality of documents to generate a search result identifying at least one document relevant to the query according to a ranking order;
    determining, by the server device, from the data structure the uniform resource locator for the document predefined to be relevant based on the at least a portion of a query;
    processing, by the server device, the search result as generated to associate at a position of the ranking order in the search result the uniform resource locator for the document predefined to be relevant to the at least a portion of the query as determined from the data structure; and
    returning, by the server device, the search result including the associated uniform resource locator for the document predefined to be relevant to the client access device.

16. The method of claim 15, wherein the method further comprises:
- determining whether the uniform resource locator for the document predefined to be relevant based on the at least a portion of the query cached in the data structure exists in the search result; and
- extracting the uniform resource locator for the document predefined to be relevant from the search result if it exists before the uniform resource locator for the document predefined to be relevant is associated with the search result.

* * * * *